United States Patent
Koistinen

(10) Patent No.: US 7,372,847 B2
(45) Date of Patent: May 13, 2008

(54) DATA CALL ROUTING ON IP CONNECTIONS

(75) Inventor: Tommi Koistinen, Vantaa (FI)

(73) Assignee: Nokia Corporation (FI)

( * ) Notice: Subject to any disclaimer, the term of this patent is extended or adjusted under 35 U.S.C. 154(b) by 959 days.

(21) Appl. No.: 10/172,739

(22) Filed: Jun. 17, 2002

(65) Prior Publication Data

US 2002/0196790 A1     Dec. 26, 2002

Related U.S. Application Data

(63) Continuation of application No. PCT/FI00/01097, filed on Dec. 14, 2000.

(30) Foreign Application Priority Data

Dec. 17, 1999   (FI) .................................. 19992720

(51) Int. Cl.
- *H04L 12/56* (2006.01)
- *H04L 12/66* (2006.01)
- *H04J 1/02* (2006.01)

(52) U.S. Cl. ................. 370/352; 370/401; 370/493
(58) Field of Classification Search ............ None
See application file for complete search history.

(56) References Cited

U.S. PATENT DOCUMENTS

| | | | | |
|---|---|---|---|---|
| 5,335,225 A * | 8/1994 | Brax | ..................... | 370/282 |
| 5,954,799 A | 9/1999 | Goheen et al. | | |
| 5,982,829 A | 11/1999 | Dupuy et al. | | |
| 6,141,345 A | 10/2000 | Goeddel et al. | | |
| 6,173,044 B1 * | 1/2001 | Hortensius et al. | ...... | 379/93.09 |
| 6,434,139 B1 * | 8/2002 | Liu et al. | ..................... | 370/352 |
| 6,445,932 B1 * | 9/2002 | Soini et al. | .............. | 455/556.1 |
| 6,535,521 B1 * | 3/2003 | Barghouti et al. | .......... | 370/462 |
| 6,856,612 B1 * | 2/2005 | Bjelland et al. | ............ | 370/338 |
| 6,975,624 B1 * | 12/2005 | Oda et al. | .................... | 370/354 |
| 7,062,265 B1 * | 6/2006 | Chang et al. | ............ | 455/426.1 |

FOREIGN PATENT DOCUMENTS

| WO | WO 97/09808 | 3/1997 |
|---|---|---|
| WO | WO 97/29563 | 8/1997 |
| WO | WO 98/43387 | 10/1998 |
| WO | WO 99/31911 | 6/1999 |
| WO | WO 99/44352 | 9/1999 |
| WO | WO 99/57923 | 11/1999 |
| WO | WO 00/25526 | 4/2000 |
| WO | WO 00/31933 | 6/2000 |

* cited by examiner

*Primary Examiner*—Chi Pham
*Assistant Examiner*—Soon D. Hyun
(74) *Attorney, Agent, or Firm*—Pillsbury Winthrop Shaw Pittman, LLP

(57) ABSTRACT

A method and an intermediate element, or a gateway, for routing an information flow in a telecommunication system including a plurality of switching centres. The switching centres are connected with an Internet Protocol (IP) based connection via the gateways, which are arranged to perform speech coding/decoding for an information flow between the switching centres. The gateways are further arranged to detect if the information flow from the switching centre is a data call and to omit the speech coding if the information flow is a data call. The data call detection is performed based on of a symbol pattern included in the frame structure of the information flow.

9 Claims, 2 Drawing Sheets

| Octet number | Bit number | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D | D | D | D | D | D | S |
| 2 | 1 | D | D | D | D | D | D | X |
| 3 | 1 | D | D | D | D | D | D | S |
| 4 | 1 | D | D | D | D | D | D | S |
| 5 | 1 | E | E | E | E | E | E | E |
| 6 | 1 | D | D | D | D | D | D | S |
| 7 | 1 | D | D | D | D | D | D | X |
| 8 | 1 | D | D | D | D | D | D | S |
| 9 | 1 | D | D | D | D | D | D | S |

DATA CALL ROUTING ON IP CONNECTIONS

This is a Continuation Application of International Application No. PCT/FI00/01097, which was filed on Dec. 14, 2000, which designated the U.S., and was filed in the English language.

FIELD OF THE INVENTION

The invention relates to data call routing on Internet Protocol (IP) based connections and especially on Voice over IP (VoIP) connections between telecommunication switches.

BACKGROUND OF THE INVENTION

In addition to traditional speech services, mobile communication systems, such as the GSM system (Global System for Mobile communication), typically also provide non-speech services, for example transmission of texts, images, facsimile or computer files. These non-speech services are usually referred to as data services. The basic requirements for successful transmission of data services differ remarkably from those of speech services. Since errors are not allowed in data transmission, data services must be handled differently within a mobile communication network, i.e. on a transmission path from a mobile station (MS) to a mobile communication switching centre (MSC). Furthermore, data transmission between a mobile communication network, such as the GSM, and an external communication network, for example an ISDN (Integrated Services Digital Network), a PSTN (Public Switched Telephone Network) or a PDN (Public Data Network), requires a specific adaptation function called an 'Interworking Function' (IWF).

In the GSM system, the transmission path from the MS to the MSC goes through a radio interface $U_m$ to a base transceiver station (BTS) and via an Abis interface further to a base station controller (BSC) and from there via an A interface to a mobile switching centre (MSC). Somewhere between the BTS and the MSC, either on the Abis interface or on the A interface, there is a transcoder/rate adaptor unit (TRAU), the task of which is to raise and adapt the transmission rate of the bit flow arriving from the MS via the BTS up to 64 kbit/s. Physically, the TRAU can be located in connection with the BTS, the BSC or the MSC. However, the TRAU cannot be located functionally inside the MSC, but logically, it must always be situated before the MSC. Therefore, the speed of the incoming information flow via the A interface towards the MSC is always 64 kbit/s, regardless of whether the information flow consists of speech or data.

Data rate adaptation problems similar to those previously solved in ISDN data rate adaptation towards external networks arose in the design of the GSM system. As a result, a similar approach, based on the V.110 protocol, was adopted in the GSM system to handle the interface between the TRAU via the MSC to the IWF (referred to as TRAU/IWF). V.110 is an ITU (International Telecommunication Union) standard technique for data rate adaptation originally designed for adaptors between a PSTN and an ISDN. The V.110 protocol utilizes TDM frames together with end-to-end control signals for modems, and it supports both synchronous and asynchronous data . There are no error detection or correction functions. Thus, data is transmitted between the TRAU and the IWF in V.110 frames.

The IWF comprises means for relaying the transmission further to external networks. The relaying means comprise ISDN means for redirecting and reformatting the V.110 frames to the ISDN network almost as such, and a modem for modulating the data transmission towards a PSTN network or the like. Thus, the relaying means used are selected on the basis of the type of the external network.

The latest development in IP-based (Internet Protocol) networks, which are typically designed for packet data transmission, has also aroused interest in the use of these networks for the transmission of voice calls. IP-based networks are becoming very common and they offer lowcost connections or even free connections, for example in local area networks (LAN). IP connections have been introduced in inter-MSC connections in mobile networks, too. A general recommendation, Voice over IP (VoIP), is used to define, inter alia, hardware compatibility for a connection, quality of service and routing of calls. For inter-MSC IP connections, a VoIP gateway is provided on both sides of the IP connection to compress the 64 kbit/s speech transmission from the MSC. The speech is compressed at 8 kbit/s, for example, to save capacity in the IP network, and on the opposite side the other VoIP gateway decompresses the speech back to 64 kbit/s to be delivered to the respective MSC.

The problem with the arrangement described above is that the current VoIP gateways are only applicable in respect of speech and fax calls. That is, if a data call using V.110 frames is to be delivered on an inter-MSC IP connection, the VoIP gateway assumes the arriving information flow to be a speech call and tries to compress it with a speech codec. The speech codec cannot distinguish the pulse-code modulated (PCM) speech frames and V.110 data frames, wherefore the VoIP gateway compresses the data call into illegible form, which cannot be decompressed any longer.

SUMMARY OF THE INVENTION

Thus, the object of the invention is to provide a method and means for eliminating or at least alleviating the problems described above. The invention relates to a method for routing an information flow in a telecommunication system comprising a plurality of switching centres and a gateway connected to each switching centre, said switching centres being connected with an Internet Protocol (IP) based connection via the gateways, which are arranged to perform speech coding/decoding for an information flow between the switching centres. The method is characterized by
 detecting at a first gateway if said information flow from the switching centre is a data call, and
 omitting the speech coding in response to said information flow being a data call.

The invention further relates to an intermediate element, or a gateway, of a telecommunication system, which element is arranged to connect a switching centre of the telecommunication system with an Internet Protocol (IP) based connection and is arranged to perform speech coding for an information flow received from the switching centre, and speech decoding for an information flow received from the IP connection. The intermediate element according to the invention is characterized in that said element is arranged
 to detect if said information flow is a data call, and
 to omit the speech coding or decoding in response to said information flow being a data call.

The invention is based on the idea that the VoIP gateway is arranged to detect from the data flow whether the transmission in question is a data call. The detection is preferably based on a predefined symbol or bit pattern included in the data flow. In response to said detection, the VoIP gateway switches the voice codec off and handles the data flow as a data call.

An advantage of the method and the element according to the invention is that data calls can also be transmitted on IP connections between telecommunication switches. The arrangement according to the invention requires modifications only to the VoIP gateways, whereas the other network elements can be utilized as such. According to a preferred embodiment of the invention, bit patterns of predefined and currently applied frame formats are used in data call detection, preferably in at least two consecutive frames, thus facilitating the VoIP gateway configuration and assuring reliable detection. According to another preferred embodiment of the invention, the VoIP gateway is arranged to either pass the received data flow as such to the IP connection or extract the data bits from the received data flow and insert them into a more efficient frame format for further transmission on an IP connection. The choice can be made on the basis of the payload ratio of all the transmitted bits.

BRIEF DESCRIPTION OF THE DRAWINGS

A more detailed embodiment of the invention can be had from the following description of preferred embodiments given by way of example and to be understood in conjunction with the accompanying drawings wherein.

DETAILED DESCRIPTION OF THE INVENTION

In the following, a reference is made to FIG. 1, which is a simplified block diagram illustrating a state-of-the-art VoIP architecture for inter-MSC connections. A speech call connection is made from a first mobile station MS1 to a first mobile switching centre MSC1 in a manner described above, the speech call being destined for a second mobile station MS2 connected to a second mobile switching centre MSC2. The speech transmission arrives at the MSC1 at a data rate of 64 kbit/s, and it is further relayed to a first VoIP gateway VoIP_GW1 at the same speed. The VoIP_GW1 comprises a speech codec, which compresses the speech to be transmitted over the IP network to a rate of 8 kbit/s, for example. Also other rates can be applied on IP connections, such as 5.6 or 12.2 kbit/s.

Figure 2:
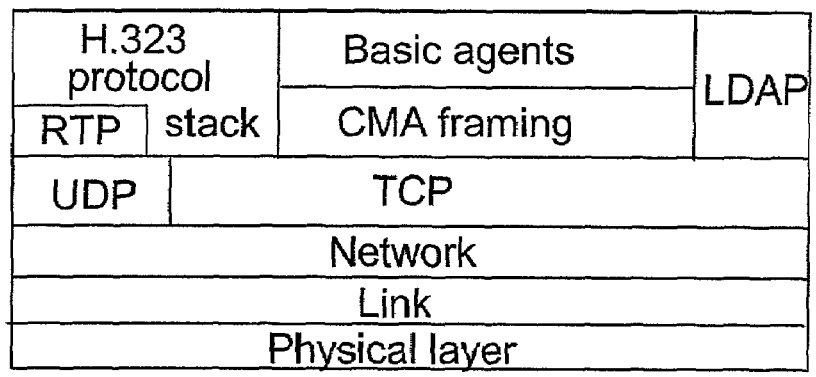
FIG. 2 shows a VoIP recommendation for a protocol stack.

The functions of the gateway VoIP_GW will be described below in more detail with reference to FIG. 2, which shows a VoIP recommendation for a protocol stack of IP calls. The transmission protocol on top of the IP network protocol is either a TCP (Transmission Control Protocol) or a UDP (User Datagram Protocol), depending on the application used in the end-to-end connection. The TCP is a more reliable transmission protocol, which allows retransmission of data packets, but the UDP is more suitable for real-time transmission applications, as no re-transmission is applied.

Further, on top of the UDP layer there is a RTP (Real Time Protocol) layer. RTP is a widely used protocol for encapsulating the UDP based user data.

The next layer comprises an H.323 protocol stack, which is an ITU framework of standards defining how voice, data and video are transported over IP networks, and establishing standards for audio and video compression and decompression. H.323 is applied to call set-up and compatibility negotiations between the peers and to the reservation of capacity from the IP network for a real-time speech connection. Call control and related activities, such as choosing the transmission protocol, speech coding/decoding, voice activity detection (VAD) and DTMF handling, are performed in a Call Management Agent System (CMAS), which comprises a CMA Framing section and Basic Agents for each activity. The CMAS utilizes a Lightweight Directory Access Protocol (LDAP), which can handle the IP address resolution between different kinds of networks and directory servers without any help from the transmission protocol. The activities of the CMAS and the LDAP can be handled by remote servers connected to the IP network, but the VoIP_GW applies the information they provide in accordance with the aforementioned H.323 tasks when forwarding calls in the IP network.

Figure 1:
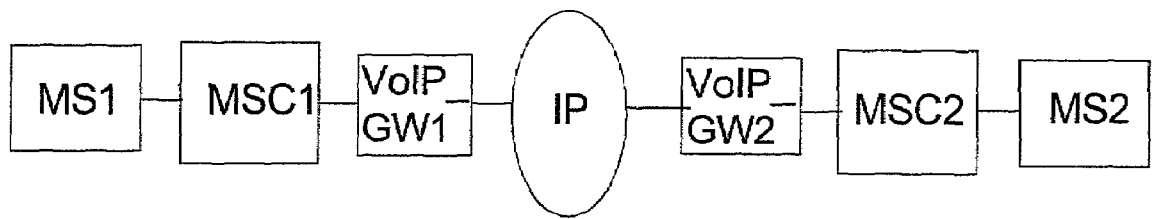
FIG. 1 is a simplified block diagram illustrating a state-of-the-art VoIP architecture for inter-MSC connections.

With reference to FIG. 1, when the VoIP_GW2 receives data packets comprising the transmitted speech from the IP network, it decompresses the speech and thus performs a data rate adaptation back to 64 kbit/s. The speech is further transmitted at this speed via the MSC2 to TRAU2 (not shown), which performs a rate adaptation to 16 or 8 kbit/s, depending on whether the used speech channel is a full-rate channel or half-rate channel, respectively. The channel coded radio transmission between BTS2 (not shown) and the MS2 is performed approximately at 25 kbit/s.

Figure 3:
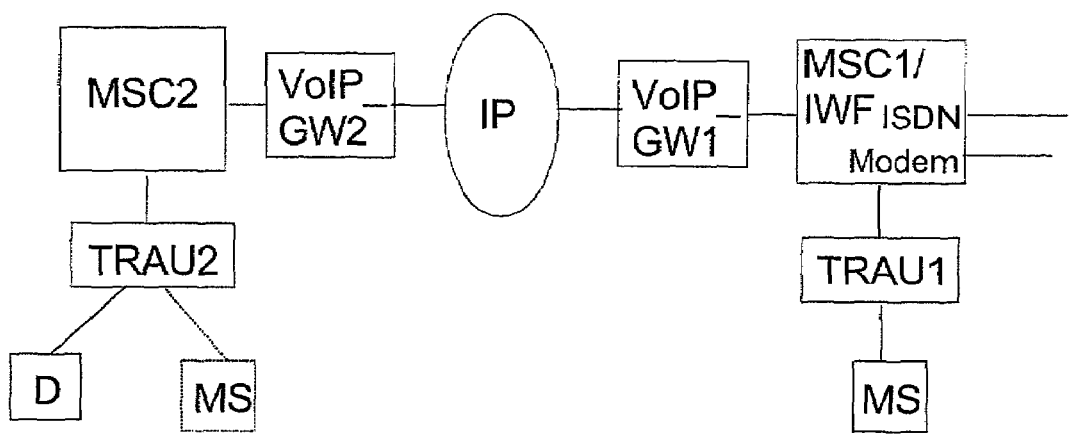
FIG. 3 is a simplified block diagram of a mobile network arrangement utilizing an inter-MSC IP connection according to the invention.

FIG. 3 illustrates a mobile network arrangement utilizing an inter-MSC IP connection according to the invention. The illustration only shows the network elements that are relevant to a data call. In the same way as in FIG. 1, two mobile switching centres, MSC1 and MSC2, are connected by an IP network. Between the MSCs and the IP network there are intermediate elements VoIP_GW1 and VoIP_GW2, respectively. The transcoder/rate adaptor unit TRAU1 inserts a mobile originated data call into V.110 frames, which are further transmitted to the MSC1. If the destination point D of the data call is connected to the MSC2, the most preferred way of routing the data call to the destination point D would be via the IP network between the MSCs. It is possible to route the data call from the MSC1 to the MSC2 via a public telecommunication network, such as the PSTN or the ISDN, but that would unnecessarily consume the network capacity and also possibly include unnecessary rate adaptations.

V.110 frames are organized according to a certain frame structure, which also comprises a synchronization pattern for ensuring reliable data stream transmission. According to the invention, the intermediate elements VoIP_GW1 and VoIP_GW2 are arranged to detect said synchronization pattern from the data flow, and in response to said detection, they are arranged to switch the speech codec off and to handle the data flow as a data call. As a result, the data call can be transmitted from the VoIP_GW1 to the corresponding gateway VoIP_GW2 via an IP connection.

According to a first embodiment of the invention, the intermediate elements allow the incoming V.110 frames to pass without any modifications in response to the detection. Thus, the data is further transmitted as such on the IP link at a rate of 64 kbit/s. No tasks related data modifications or compression are allocated to gateways.

According to a second embodiment of the invention, the intermediate elements are arranged to decode the received V.110 frames and extract the data bits from the frames. The extracted data bits are further transmitted by inserting them into another frame format, which then includes the data bits and a few frame format specific control bits. The data flow according to the said another frame format is then transmitted on the IP link at a significantly lower data rate than 64 kbit/s. This embodiment of the invention is especially advantageous when transferring data on low data rates, such as 9.6 kbit/s or 14.4 kbit/s. The TRAU converts these low-rate data flows directly to 64 kbit/s. As a result, the payload of 9.6 kbit/s would occupy the whole transfer rate of 64 kbit/s, which is very uneconomical in view of the network capacity. This is avoided by compressing the data flow in such a way that the relative share of the payload bits in relation to the total data rate is as high as possible. The applied frame format could be for example RTP (Real Time Protocol) frames or some proprietary solution, as long as both gateways on the opposite sides of the IP link recognize the frame format.

Figures 4, 5:
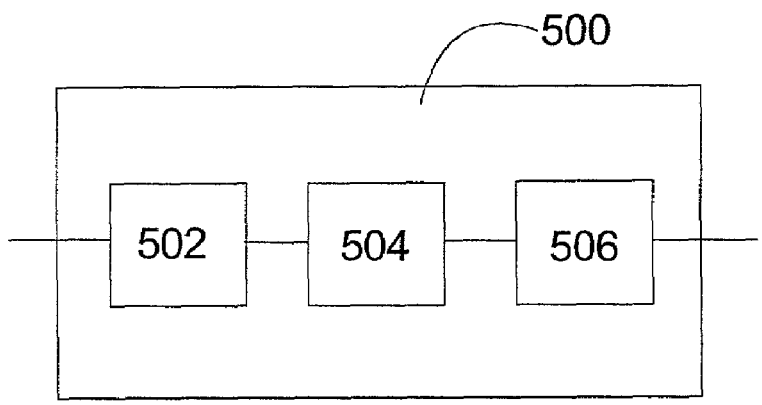
FIG. 4 shows the frame structure of the V.110 protocol.
FIG. 5 is a functional block diagram illustrating a gateway according to the invention.

FIG. 4 shows a V.110 frame structure of 80 bits, i.e. the frame consists of ten bytes of eight bits. The synchronization pattern included in the frame consists of the first eight bits (the first byte) having a bit value of 0, and the first bits of the remaining nine bytes are set to 1. Thus, the synchronization pattern of a V.110 frame consists of 17 bits. Seven bits (E) are reserved for defining the end-to-end connection, including rate repetition information, network independent clock information and multiframe information. Eight status bits (S, X) are reserved for conveying channel control information associated with the data bits in the data transfer state. The remaining 48 bits are then used for user data. The gateway VoIP_GW is advantageously arranged to detect the 17-bit synchronization pattern from the received data stream.

According to a preferred embodiment of the invention, the gateway VoIP GW must detect the 17-bit synchronization pattern in at least two consecutive frames. In response to the detection of the synchronization pattern in at least two consecutive frames, the voice codec is turned off and the data call is handled appropriately. This is to ensure reliable synchronization with the received data stream by the gateway.

According to a preferred embodiment of the invention, the first gateway VoIP_GW1 is arranged to include information in the data stream to be delivered to the second gateway VoIP_GW2 via the IP connection, the information indicating the data stream to be in V.110 frame format, for example. Thus, there is no need in the second gateway VoIP_GW2 to perform the data call detection based on the synchronization pattern.

The advantages of the invention will now be further illustrated by way of example with reference to FIG. 3. As a starting point, a mobile station MS forms a data call for example for reading e-mail from a mail server connected to a LAN (Local Area Network, not shown). The LAN is further connected to a public telecommunication network, such as a PSTN or an ISDN. The data call is transmitted in the mobile communication network to the transcoder/rate adaptor unit TRAU1, which inserts the data into V.110 frames and sends the frames to MSC1. An interworking function IWF of the MSC1 comprises means for relaying the V.110 transmission further to external networks, as explained above, and the relaying means used are selected on the basis of the type of the external network. Thus, a data call connection is established between the MS and the LAN via the MSC1/IWF.

During the data call, the MS is moving around and performs a handover to a cell of another mobile switching centre MSC2. However, the IWF responsible for the external connection remains at the MSC1 and the MS aims to maintain the data call connection to this IWF. The connection between the MSC1 and the MSC2 is an IP link with gateways VoIP_GW1 and VoIP_GW2 on opposite sides of the link, respectively. The data call is now converted at the TRAU2 into V.110 frames and transmitted through the MSC2 to the VoIP_GW2. According to the invention, the VoIP_GW2 is preferably arranged to detect the V.110 synchronization patterns from the received data stream. The VoIP_GW2 identifies the incoming data flow as a data call, switches the voice codec off and transmits the data call further to the IP link, either as such or compressed into an appropriate format. The VoIP_GW1 on the opposite side of the IP link performs decompression back to V.110 frames, if needed, and transmits the data flow to the MSCI/IWF for further processing and transmission.

Thus, a data connection can also be maintained in an inter-MSC handover in the VoIP architecture according to the invention. An inter-MSC data call handover could not be performed in a state-of-the-art VoIP architecture for inter-MSC connections.

The structure of the gateway will now be further explained with reference to FIG. 5. Only the relevant functional blocks in carrying out the invention are shown in FIG. 5. The gateway 500 comprises detecting means 502 for detecting the predefined symbol pattern, control means 504 for controlling the speech coding and coding/decoding means 506 for performing the data bits extraction and insertion into new frame format, if necessary. The gateway typically comprises a control processor and a digital signal processor (DSP). The control processor receives the incoming data flow and controls the operation of the gateway. The DSP is typically programmed to execute all data processing functions that require significant processing power. The relevant means 502-506 described above can advantageously be implemented by means of said processors. The detection can be performed by the control processor, but preferably by the DSP. Also the speech coding control can be allocated either to the control processor or to the DSP. Data bits extraction and insertion into new frame format is preferably done by the DSP.

The invention has been explained above in connection with the V.110 frame format. However, it is obvious for a skilled person that the invention can be carried out by utilizing any other frame format, which comprises a detectable bit or symbol pattern. An example of such frame formats is illustrated in the V.120 protocol.

V.120 is an ITU standard for data rate adaptation, which allows for reliable transport of synchronous, asynchronous or bit-transparent data over ISDN bearer channels. V.120 uses HDLC (High-level Data Link Control) protocol frames. The HDLC protocol is a general-purpose protocol which operates at the data link layer of the OSI reference model. The protocol uses the services of a physical layer and provides either a best effort or a reliable communications path between the transmitter and the receiver (i.e. with acknowledged data transfer). The type of service provided depends upon the HDLC mode which is used. Each piece of data is encapsulated in an HDLC frame by adding an 8-bit HDLC flag both at the beginning and at the end of an HDLC frame. In front of the latter HDLC flag there is a Frame Check Sequence (FSC) for error detection. The FSC is derived from the frame information on the basis of Cyclic Redundancy Check (CRC).

V.120 utilizes the HDLC frames with 56 kbit/s links. Inter-frame flags are used to pad these out to the maximum rate of 64 kbit/s. Only seven of the eight bits are used, with the last bit being always set to 1. Thus, V.120 frames comprise several repeated bit patterns, both in the HDLC frame contained in the V.120 frame and in the V.120 frame as such, and these bit patterns can be detected. The gateways used on the IP link can be set to detect these patterns in the same manner as described in connection with V.110 frames.

The invention has been illustrated above in regard to a mobile communication system. However, the invention is applicable to fixed-line telecommunication networks, too. An example of this is an ISDN data call, which is to be transmitted via a fixed-line switching centre FSC1 (corresponding to the MSC1) and an IP link to another fixed-line switching centre FSC2 (corresponding to the MSC2). The ISDN data call is transmitted in V.110 or V.120 frames, which results in the same problem of the VoIP gateways not responding to data calls appropriately . Again, the gateways can be configured to detect certain bit patterns typical of a data call and, in response to said detection, to switch the voice codec off and to transfer the data call further to an IP connection, either as such or with the data bits extracted and inserted into a more efficient frame format.

It is obvious for those skilled in the art that as the technology develops the basic idea of the invention can be carried out in numerous ways. Thus, the invention and its embodiments are not limited to the previous examples, but they may vary within the scope of the appended claims.

The invention claimed is:

1. A method for routing an information flow in a gateway node connecting a switching center to an internet protocol network, the method comprising:
   detecting at a first gateway from frames in said information flow if said information flow is a data call,
   omitting the speech coding in response to said information flow being a data call,
   performing said data call detection on the basis of a symbol pattern included in the frame structure of said information flow, wherein said symbol pattern is either the synchronization bits of a V.110 frame or said symbol pattern is included in V.120 frame structure, and
   detecting said symbol pattern in at least two consecutive frames.

2. A method according to claim 1, the method comprising:
   transmitting the information flow from the first gateway via an internet protocol connection to a second gateway without modifications in response to said data call detection.

3. A method according to claim 1, the method comprising:
   extracting the data bits from the information flow in response to said data call detection,
   inserting the data bits into another frame format, and
   transmitting the modified data format from the first gateway via an internet protocol connection to a second gateway.

4. A method according to claim 1, wherein said switching center is a mobile switching center of a mobile communication system.

5. An intermediate element, or a gateway, wherein the element is configured to:
   connect a switching center to an internet protocol network,
   detect from frames in said information flow if said information flow is a data call,
   omit the speech coding or decoding in response to said information flow being a data call,
   perform said data call detection on the basis of a symbol pattern included in the frame structure of said information flow,
   wherein said symbol pattern is either the synchronization bits of a V.110 frame or said symbol pattern is included in a V.120 frame structure and wherein said element is arranged to detect said symbol pattern in at least two consecutive frames.

6. An element according to claim 5, wherein said element comprises is configured to transmit the received information flow via an internet protocol connection to a second intermediate element without modifications in response to said data call detection.

7. An element according to claim 5, wherein said element is configured:
   to extract the data bits from the received information flow in response to said data call detection,
   to insert the data bits into another frame format, and
   to transmit the modified data format via an internet protocol connection to the second intermediate element.

8. An element according to claim 5, wherein said element comprises
   detecting means for detecting a predefined symbol pattern, control means for controlling the speech coding and coding/decoding means for performing the data bits extraction and insertion into new frame format.

9. An intermediate element, or a gateway, wherein the element comprises:
   means for connecting a switching center to an internet protocol network,
   means for detecting from frames in said information flow if said information flow is a data call,
   means for omitting the speech coding or decoding in response to said information flow being a data call, and
   wherein performing said data call detection is done on the basis of a symbol pattern included in the frame structure of said information flow,
   wherein said symbol pattern is either the synchronization bits of a V.110 frame or said symbol pattern is included in a V.120 frame structures,
   wherein said element comprises means for detecting said symbol pattern in at least two consecutive frames.

* * * * *